Figure 1:
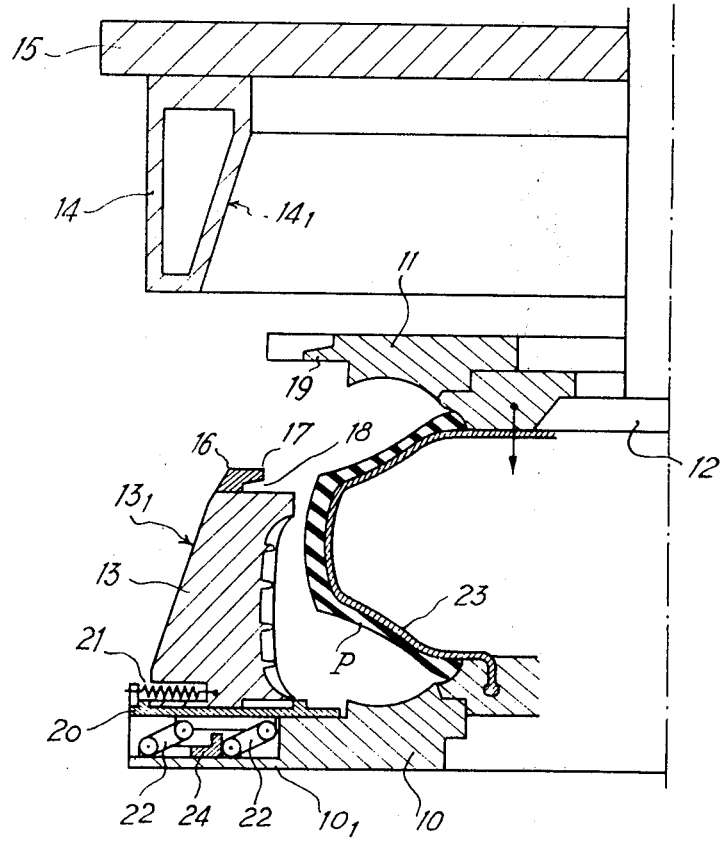

United States Patent [19]

Le Moullac

[11] 3,990,823
[45] Nov. 9, 1976

[54] SECTIONAL MOLD FOR THE TIRE CASINGS

[75] Inventor: Roger Le Moullac, Le Plessis Bouchard, France

[73] Assignee: Pneumatiques, Caoutchouc Manufacture et Plastiques Kleber-Colombes, Colombes, France

[22] Filed: Mar. 31, 1975

[21] Appl. No.: 563,381

[30] Foreign Application Priority Data
Mar. 29, 1974  France .............................. 74.11083

[52] U.S. Cl. .................................. 425/47; 425/46; 425/38
[51] Int. Cl.² ......................................... B29H 5/02
[58] Field of Search .................... 425/42, 29, 46, 47, 425/17

[56] References Cited
UNITED STATES PATENTS

| | | | |
|---|---|---|---|
| 1,179,898 | 4/1916 | Coffey et al. | 425/47 |
| 3,461,502 | 8/1969 | Turk et al. | 429/29 |
| 3,464,090 | 9/1969 | Cantasutti | 425/46 X |
| 3,713,929 | 1/1973 | Bottasso et al. | 425/42 X |
| 3,779,677 | 12/1973 | Greenwood | 425/46 |
| 3,833,323 | 9/1974 | Pasch | 425/47 |
| 3,847,520 | 11/1974 | Plumbaus | 425/47 |
| 3,850,555 | 11/1974 | Pasch | 425/46 |
| 3,852,006 | 12/1974 | Irie | 425/47 |
| 3,854,853 | 12/1974 | Mirtain | 425/47 |

FOREIGN PATENTS OR APPLICATIONS 1,169,118  4/1964  Germany .............................. 425/17

*Primary Examiner*—J. Howard Flint, Jr.
*Attorney, Agent, or Firm*—Craig & Antonelli

[57] ABSTRACT

Sectional molds for tires wherein radially movable sectors are mounted in a permanent way on a fixed lower casing of the mold in such a way that the sections do not have to be lifted and pulled up with a movable upper platform, when the press of the mold is opening. The sectors are connected to the lower casing which supports them by connecting means such as linked struts that are operatively associated with the sectors, at the beginning of the opening of the mold, having at the same time a slight lifting movement parallel to the lower casing and a slight radial backward movement assuring the detachment of the sectors with respect to the tread of the molded tire.

11 Claims, 6 Drawing Figures

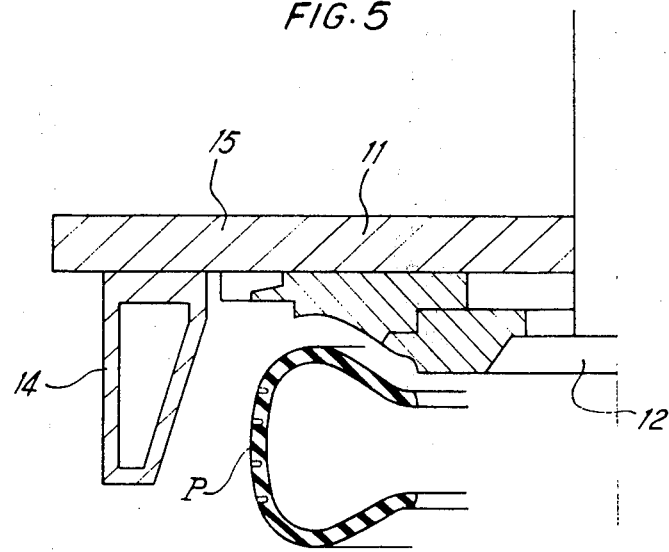
FIG. 5
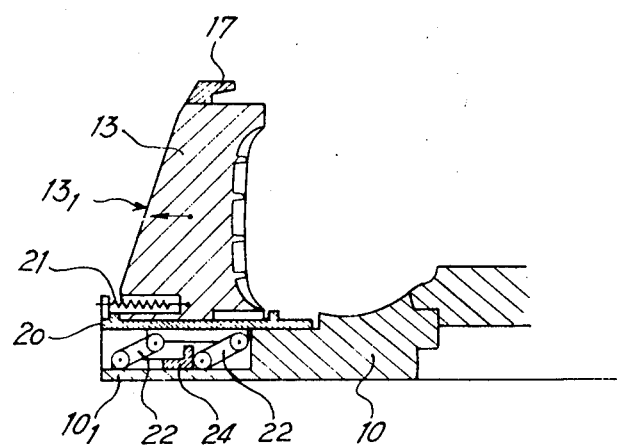

SECTIONAL MOLD FOR THE TIRE CASINGS

The present invention relates to sectional molds used for the molding and the vulcanization of the casings of pneumatic tires.

These molds generally comprise a lower casing for the molding of one sidewall of a tire which is relatively fixed, an upper casing for the molding of the other sidewall of the tire which is axially moveable, and an assembly of sectors distributed in the shape of a ring and being radially moveable for the molding of the tread of the tire.

With most of the sectional molds being made and used for industrial purposes the radial movement of the sectors is obtained from the axial movement of the upper platform of the press due to cooperation of the conical surfaces arranged, on the one hand, over the outer surface of the sectors, and, on the other hand, over a skirt or band fixed to an upper platform of the press. This system sometimes has a double effect, that the axial movement during decent and the axial movement during ascent of the platform with regard to the sectors are used for joining the sectors when the mold is closing as well as for separating them when the mold opens. The sectors are connected in a moveable, but permanent way to the skirt of the moveable upper platform of the press, in such a way, that when the press is opening the sectors remain suspended to the upper platform and accompanying this platform in its movement of lifting and then tipping or tilting up of the tire. The platform of the press and its operating mechanism therefore have to be dimensioned with regard to support and to displace the weight of the sector assembly unit over and above the weight of the upper casing of the mold. However, other sectional molds have been proposed, wherein the moveable or mobile sectors are permanently supported by a fixed lower platform of the press or by a fixed lower casing of the mold resting on this platform in a way that the sectors do not have to be lifted with the moveable lower platform, when the press opens. In this case, the radial movement of the closing of the sectors can also be operated by a skirt or conical band carried by the moveable upper platform and co-operating with the conical outer surfaces of the sectors. But the radial movement of the opening of the sectors is then operated by other means, for example springs attracting the sectors towards their open position. Meanwhile, the pull-back springs have to be sufficiently strong in order to overcome the friction of the sliding of the sectors, but especially the power of adherence resulting from the imbrication of the molding contrasts or reliefs of the sectors in the sculpture of the tread of the molded tire. When the mold is closing, the closing mechanism of the press has to overcome the resisting power of these strong pull-back springs in order to be able to join the sectors radially.

In the known, above referred sectional molds, the use of a conical band to operate at least the radial movement of the closing of the sectors is interesting from another aspect, too. In fact, the band can conveniently be rendered heated, for example by channels for circulation of vapor in such a way to heat the sectors with which it (the band) is in contact during the molding operation and the vulcanization of the tire.

The invention concerns especially sectional molds relating to those of the second type heretofore described and comprising a lower casing for the molding of one sidewall of the tire, on which radially moveable sectors for the molding of the tread are permanently mounted, and an upper casing for the molding of the other sidewall being axially moveable with regard to the lower casing; the sectors mounted on the lower casing advantageously do not have to be lifted or pulled with the upper platform, when the press is opened.

An object of the invention is to provide, with this type of mold, a positive release or detachment of the sectors with regard to the tread of the molded tire, at the beginning of the opening of the mold, in such a way that the detached sectors can be brought back more completely towards their open positions with relatively weak pull-back means. This also allows reduction of the force which would then be necessary to operate the radial bringing-together of the sectors at the later closing of the mold. Another object of the invention is to provide that this detachment of the sectors be effected essentially in the radial direction with regard to the tread of the molded tire in order to exclude any risk that the sculpture of the tread might be damaged. Yet another object of the invention is to provide that this detachment of the sectors with regard to the tread requires only a relatively small effort over the sectors thanks to the use of means offering little frictional resistance.

Figure 6:
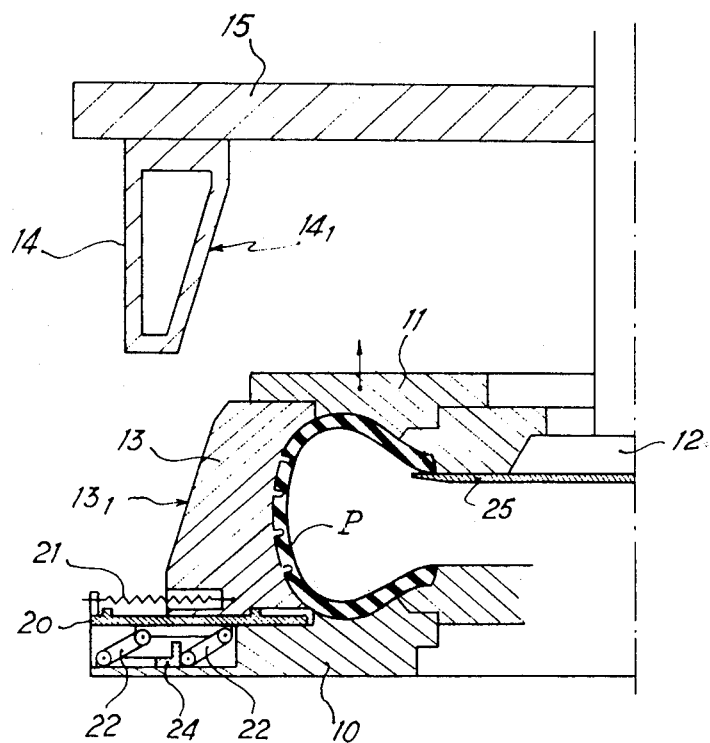

Examples of the embodiments of the invention are hereinbelow described in detail with reference to the accompanying drawings in which:

FIGS. 1 to 5 are partial-elevational views showing a mold in different successive positions during operation of a press for forming a tire casing; and FIG. 6 is a partial-elevational view of a different mold in a closed position.

The mold illustrated in FIGS. 1 to 5 comprises, in a classical manner, a lower part of casing 10 mounted on a fixed lower platform of a press (not shown), an upper part or casing 11 fixed concentrically to an axially moveable piston 12 of the press, and a series of radially moveable sectors 13 mounted on the lower casing 10. The lower and the upper casings have opposite concave surfaces for the molding of the sides or flanks of the tire; whereas the sectors have inner surfaces provided with a relief for the molding of the sculpture or pattern of the tread of the tire. The dorsal or back outer surface $13_1$ of the sectors is shaped conically upward in order to cooperate with the corresponding conical surface $14_1$ of a skirt or guide 14 fixed to the axially moveable upper platform of the press and to serve for closing of the sectors of the mold.

The skirt 14 is hollow in order to allow the circulation of the heating fluid, such as vapor, e.g., steam, and it is used for the heating of the sectors 13 during the vulcanization of the tire when the mold is closed.

Each sector 13 has at its upper part an element 16 with an edge 17 which is turned towards the inside to define a groove or notch 18. At its side, the upper casing or shell 11 provides an edge 19 turned towards the outside and arranged to penetrate into the groove 18 of the sectors when the mold is being closed. The two elements, groove 18 and edge 19 form, between the upper casing (shell) 11 and the sectors 13, interlocking means which are separable to allow the opening of the mold.

The sectors 13 are mounted radially to be moveable on the lower casing (shell) 10, each via means of a platform 20. This platform is provided at its upper surface with radial slide-bars, inside which each sector slides. A tension spring 21 which engages on the one hand, a pin provided at the front of each platform 20, and, on the other hand, the bottom of a radial recess in each sector, constantly attracts each sector to its open radially position remote from the vertical axis of the press. This remote position of each of the sectors 13 is determined by an abutment limiting the intended course of the sectors within the radial guiding means for the sectors on the respective platform. The slide-bars of the platform 20 assure also stopping, i.e., holding back, of the sectors in the axial direction. The platform individually carrying each sector 13 is connected to the fixed lower casing (shell) 10 through parallel struts or arms 22 linked, on the one hand, to the lower surface of the platform, and, on the other hand, to the bottom of the recess arranged in the outer edge $10_1$ of the casing 10. The struts 22 describe together with the casing 10 and each platforms 20 a linked deformable parallelogram system. In normal position, the platforms 20 allow the sectors to rest on the upper surface of the edge $10_1$ of the casing 10 and the struts 22 are thus slightly inclined towards the top and the axis of the press.

By pivoting towards the outside around their lower axes of connection at the casing, the struts 22 allow the platforms 20 and the sectors associated therewith to be simultaneously lifted axially towards the outside with regard to the casing 10. This pivoting movement of the struts 22 is preferably limited by an abutment such as 24 in order to prevent the struts from extending over the vertical position whereby the platform 20 — sector 13 unit will still be brought back by gravity towards the inside of the mold.

FIG. 1 shows the mold at the beginning of the closing of the press. The platforms 20 and associated sectors 13 are lowered to allow the sectors 13 to rest on the outside edge $10_1$ of the casing 10; the sectors 13 are each maintained in a remote position towards the outside by springs 21. As shown, an unfinished tire P has been introduced into the press and the upper casing 11 has begun to come down; whereas, the round bladder or bag 23 has been inflated in order to distend the tire outwardly.

Figure 2:
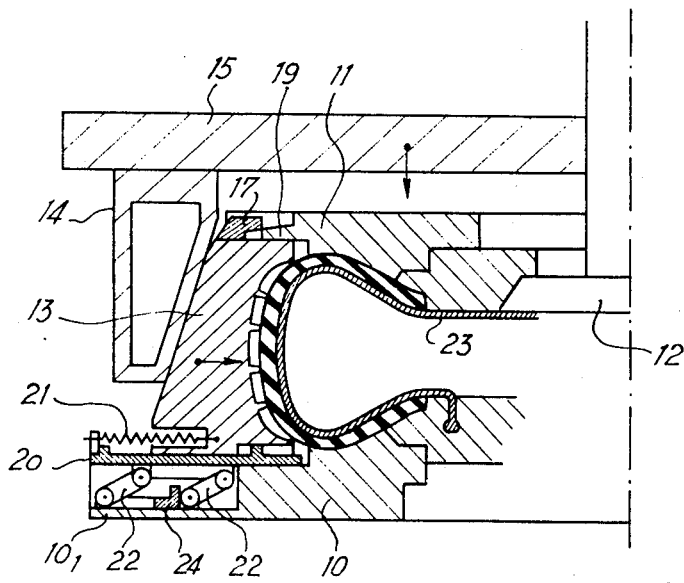

In FIG. 2, the upper casing 11 has reached its lower position for closing; it is in contact with the flank of the tire and the upper platform or support 15 of the press is in the course of decending. The skirt 14 has come in contact with the sectors 13 and the cooperation of the conical surface $14_1$ of the skirt and the conical surfaces $13_1$ of the the sectors cause the radial displacement of the sectors towards the inside of the mold. In the course of this movement, the sectors 13 slide with respect to the platform supports 20 and to the casing 10 contrary to the biasing action of their pull-back springs 21 and the outside edge 19 of the upper casing 11 engages in the groove 18 provided under the edge 17 of each of the sectors 13.

Figure 3:
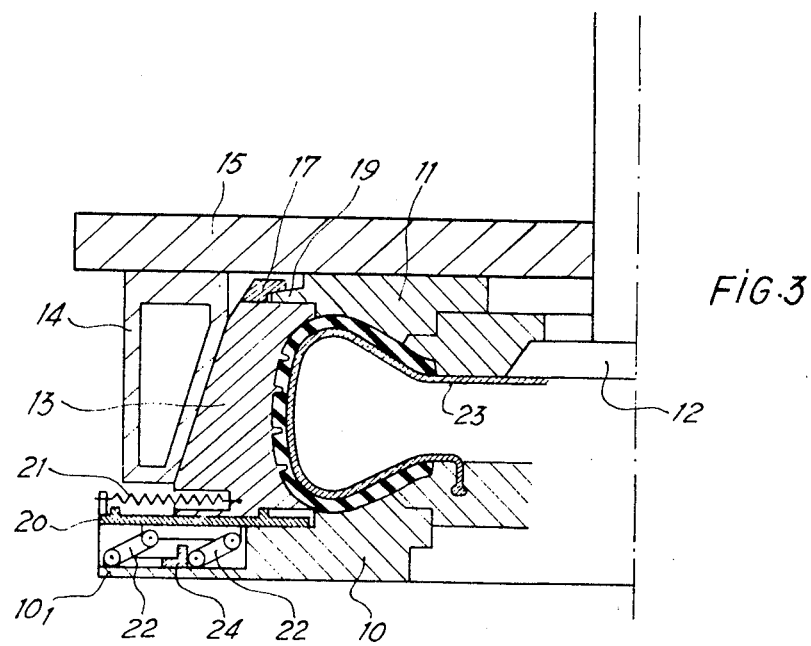

In FIG. 3, the closing of the mold is completed. The platform 15 of the press has come in contact with the upper casing 11, and the heating band 14 maintains the radially applied sectors 13 against the casings 10 and 11 during the vulcanization of the tire.

In the course of the vulcanization, the tire is maintained applied against the inner surfaces of the mold by the inner pressure of the bag 23 in order to transmit to the tire the form and the patterns of the mold.

Figure 4:
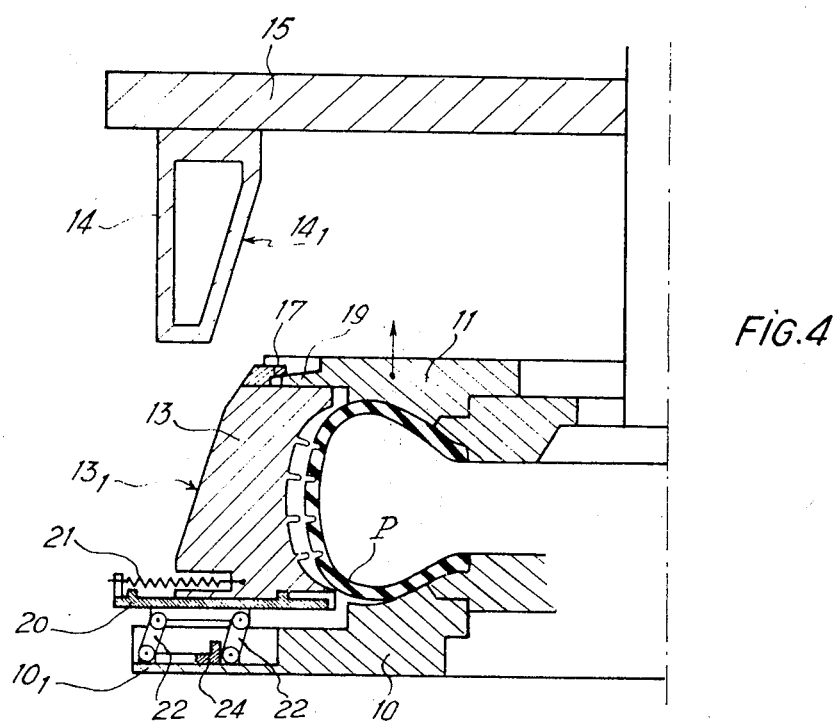

FIG. 4 shows the beginning of the opening of the mold. The upper platform 15 and the band 14 have previously been lifted so that the outer conical surfaces $13_1$ of the sectors are free to allow a subsequent radial movement of the sectors. The piston of the press begins to axially lift the upper casing 11, which, by its outer edge 19, equally lifts the platforms 20 and the sectors 13. Under the effect of the pivoting of the struts 22, this axial movement of lifting the sectors 13 is accompanied by a radial backward movement which detaches the surfaces of the sectors of the mold from the sculpture of the tread of the molded tire by surmounting the resistance due to the adherence between the surfaces of the sectors and the molded tire and to the imbrication of these surfaces in the sculpture of the tread. As soon as this detachment is effected, the edges 17 of the sectors 13 slip out over the outside edge 19 of the upper casing 11 and allow the platforms 20 to fall back by gravity onto the edge $10_1$ of the casing 10; whereas, at the same time, the sectors 13 are radially pulled towards the outside by means of their pull-back springs 21.

FIG. 5 shows the final stage of the opening of the mold. The upper casing 11 is pulled up against the platform 15 of the press and the unit platform casing can tilt or tip up as usual in order to detach more completely the inside of the mold in view of the extraction of the finished tire. According to the type of the press, the tire can be brought up towards the top with the upper casing and with the piston 12 of the press, and then fall back on a vacating platform towards the front of the press, or else it can rest on the lower casing 10 before being lifted up. The press is then ready for a new cycle of operation.

In the phase of the opening of the mold shown in FIGS. 4 and 5, the radial detachment of the sectors with regard to the sculpture of the molded tire is obtained by the fact that the sectors 13 are lifted up to a sufficient height, although slight, with regard to the casing 10, so that through the pivoting of the struts 22 of the linked parallelogram they are radially pushed back at a distance that is somewhat larger than the radial depth of the molding relief portions of the sectors. The radial length of the interlocking means 17 – between the sectors and the upper casing 11 is preferably somewhat larger than the radial depth of the grooves and the like imprinted by the sectors in the tread of the tire in order to be sure that this detachment is effective at the moment when the axial slipping-out of the interlocking means takes place. In order to promote this movement of the detachment of the sectors and the slipping-out of the edges 17 and 19, the edges can be given the form of conical slopes and/or of rounded leading edges. This also promotes a good positioning at the moment of the interlocking, when the mold is closing. On the other hand, this backward movement of the sectors 13 onto their platform supports 20 must be sufficient, so that the lower upper edge of the sectors provides a free passageway for the finished tire.

FIG. 6 shows another example of an embodiment of a mold according to the invention. It differs from the one illustrated in FIGS. 1 to 5 in the fact that it is not provided with separable interlocking means such as 17, 19 between the sectors 13 and the upper casing 11. In the closed position of the mold, the sectors 13 are simply tightened under the outer edge of the upper casing 11. At the moment of the opening of the mold, after the bag 23 has been deflated and drawn towards the inside of the press and after the platform 15 with its skirt 14 has been pulled up, arms 25 of the extractor of the press are positioned under the upper bead of the molded tire. The tire is then pulled towards the top of the mold by the arms 25 with the piston 12 and the upper casing 11 and it is simultaneously lifting the sectors 13 from the lower casing 10.

As before, the pivoting movement of the struts 22 give to the sectors 13 a slight radial backward movement that is sufficient to assure the positive disengagement and detachment of the sectors 13 with regard to the tread of the molded tire. Once this disengagment is effected, the pull-back springs 21 radially pull the sectors towards their completely open position in order to give a free passageway to the molded tire which has been lifted with the piston 12 by the arms 25 of the extractor. In an upper position of the piston 12, the arms 25 are drawn aside and let the tire fall onto the vacating platform of the press. This last embodiment is therefore suitable for presses of vulcanization having an extractor mechanism with retractable arms such as 25.

An essential advantage of the molds according to the invention is that the positive and certain detachment of the sectors with regard to the sculpture of the molded tire can be obtained due to a relatively small effort on the sectors. The pull-back springs 21 of the sectors do not need to participate in a significant way in this detachment and they can therefore exhibit a weak pulling force of tension to only assure the backward movement of the already disengaged sectors. When the mold is closing, these springs will only oppose a reduced resistance to the radial displacement towards the inside of the sectors. Moreover, the assembly, including the sectors on their platform supports and the linked connection of these platforms with the lower casings, can be realized as sufficiently important in order to reduce the frictional forces.

Another advantage is that the backward movement of the sectors 13, at the moment of the disengagement from the sculpture of the tire, is purely radial with regard to the tire since the sectors are raised up by accompanying the tire and they remain parallel to the lower casing 10. The radial movement of the disengagement is therefore not risking the sculpture of the molded tire to damage. This is particularly interesting in the case of a tire having a deep and very configured sculpture.

It will be appreciated that the invention is not strictly limited to the above described embodiment from which other variations can be derived.

I claim:

1. A sectional mold for the molding of casings of tires, said mold having a vertical axis and comprising a fixed lower casing for the molding of one sidewall of the tire, radially moveable sectors for the molding of the tread being connected permanently to said lower casing, and an upper casing for the molding of the other sidewall of the tire being axially moveable with respect to the lower casing and to the sectors, each sector being mounted radially slidable on a platform support which is connected to the lower casing by parallel struts inclined upwardly and inwardly towards the axis of said mold, said struts being linked at their lower ends to said lower casing and at their upper ends to the platform supports to form a system of a deformable parallelogram for each platform support that allows the platform support, at the beginning of the opening of the mold by axial movement of said upper casing, to pass through a slight lifting movement parallel to the lower casing and a slight radial backward movement, thereby assuring the detachment of the sectors with respect to the tread of the molded tire.

2. A sectional mold according to claim 1, wherein the struts forming the deformable parallelogram for each sector are arranged to allow the sectors to be lifted by radially opening by a distance that is slightly larger than the radial depth of the reliefs for molding provided by the sectors, and pull-back means connected to the sectors to assure a supplementary backward movement of the sectors towards the complete open position of the mold.

3. A sectional mold according to claim 2, wherein abutments are provided to limit a pivoting movement of the struts forming the deformable parallelogram towards the outside of the mold to prevent the struts from extending over a vertical position whereby the platform support and the sector mounted thereon will be brought back by the force of gravity inwardly towards the vertical axis of the mold.

4. A sectional mold according to claim 2, wherein springs radially attract the sectors towards their position of a diverged opening from the vertical axis of the mold.

5. A sectional mold according to claim 1, wherein means are provided to lift the sectors parallel to the lower casing at the same time that the upper casing is lifted at the beginning of the opening of the mold.

6. A sectional mold according to claim 5, wherein said lifting means are formed by an extractor for the molded tire which is connected to a piston of the press.

7. A sectional mold according to claim 5, wherein said lifting means consist of a separable interlocking means between the sectors and the upper casing, said lifting means becoming engaged when the mold is in closed position and disengaged at the beginning of the opening movement of the mold after a slight axial displacement of the upper casing.

8. A sectional mold according to claim 7, wherein the interlocking means for the sectors with the upper casing present an effective radial length that is slightly larger than the radial depth of the molding reliefs of the sectors.

9. A sectional mold according to claim 7, wherein the upper casing provides an outer edge penetrating under a corresponding edge of the sectors.

10. A sectional mold according to claim 1, further comprising means for applying a lifting force to each sector and associated platform support to a position at which the struts are not extended over a vertical position whereby upon removal of said lifting force, said sectors and the associated platform supports are returned by gravity to a position of rest radially inward toward the axis of said mold.

11. A sectional mold according to claim 1, wherein said platform supports are provided with means for engaging the sectors during said radially backward movement outwardly from the axis of the mold.

* * * * *